United States Patent
Bhandarkar et al.

(10) Patent No.: US 6,571,582 B2
(45) Date of Patent: Jun. 3, 2003

(54) MANUFACTURE OF SILICA BODIES USING SOL-GEL TECHNIQUES

(75) Inventors: Suhas Bhandarkar, Glen Gardner, NJ (US); Yoram De Hazan, Oley, PA (US); John Burnette MacChesney, Lebanon, NJ (US); Thomas Edward Stockert, Millburn, NJ (US)

(73) Assignee: Fitel USA Corp., Norcross, GA (US)

( * ) Notice: Subject to any disclaimer, the term of this patent is extended or adjusted under 35 U.S.C. 154(b) by 63 days.

(21) Appl. No.: 09/838,727

(22) Filed: Apr. 19, 2001

(65) Prior Publication Data

US 2002/0152771 A1 Oct. 24, 2002

(51) Int. Cl.[7] ............................................. C03B 37/016
(52) U.S. Cl. .......................... 65/395; 65/17.2; 264/621; 501/12
(58) Field of Search .................... 65/395, 17.2; 501/12; 264/621

(56) References Cited

U.S. PATENT DOCUMENTS

| | | | | |
|---|---|---|---|---|
| 4,775,401 A | * | 10/1988 | Fleming et al. | 65/17.2 |
| 4,883,521 A | * | 11/1989 | Shimizu et al. | 65/17.2 |
| 5,011,669 A | * | 4/1991 | Tsuchiya et al. | 501/12 |
| 5,914,437 A | * | 6/1999 | Chandross et al. | 65/17.2 |
| 6,343,490 B1 | * | 2/2002 | Alonzo et al. | 65/395 |

* cited by examiner

*Primary Examiner*—James Derrington
(74) *Attorney, Agent, or Firm*—Peter V. D. Wilde

(57) ABSTRACT

The use of silica powders having large particle sizes in making sol-gel silica bodies has been found to have important advantages. Among these are higher gel strength, higher silica loading, more rapid aging and drying of the gel, a reduction in the amount of organic additives leading to reduced process time required for organic burn-off, and easier removal of contaminant particles due to their larger size. It was also discovered that spherical particle morphology contributes to the improved properties.

12 Claims, 3 Drawing Sheets

MANUFACTURE OF SILICA BODIES USING SOL-GEL TECHNIQUES

FIELD OF THE INVENTION

This invention relates to sol-gel processes for making large sol-gel bodies. It is especially applicable to techniques for preparing optical fiber preforms prior to fiber draw.

BACKGROUND OF THE INVENTION

A variety of methods have been suggested for the manufacture of high-silica content glass articles, such as the single and double dispersion processes described by D. W. Johnson, et al. in Fabrication Of Sintered High-Silica Glasses, U.S. Pat. No. 4,419,115, and the process described by D. W. Johnson, et al in Sintered High-Silica Glass And Articles Comprising Same, U.S. Pat. No. 4,605,428. Uses of high-silica content include the fabrication of glass rods for use as preforms in the manufacture of optical fibers as suggested by F. Kirkbir, et alii, U.S. Pat. No. 5,254,508 for a Sol-gel Process For Forming A Germania-doped Silica Glass Rod, and the fabrication of secondary cladding tubes for use during fabrication of an optical fiber by a solgel process. Although sol-gel processes enable fabrication of glass objects at lower cost than other processes, N. Matsuo, et alii, in U.S. Pat. No. 4,680,046 for a Method Of Preparing Preforms For Optical Fibers, among others, has noted that it is difficult to provide a glass article that is large enough to be used as a preform for optical fibers.

Considering that the functioning part of an optical fiber (the core and inner cladding carrying 99+% of the optical energy) typically consists of but 5% of the mass, a significant part of this effort has concerned structures providing for overcladding of such inner portion. State of the art manufacture often makes use of an inner portion constituting core and inner clad region as fabricated by Modified Chemical Vapor Deposition, or, alternatively, by soot deposition in Outside Vapor Deposition or Vapor Axial Deposition. This core rod may be overclad by material of less demanding properties, and, consequently, may be produced by less costly processing. Overcladding may entail direct deposition on the core rod, or may result from collapsing an encircling tube. Such "overcladding" tubes have been produced from soot or fused quartz. Making very large bodies of soot require extensive processing, and large bodies of fused quartz are expensive.

It has been recognized that significant economies may be realized by fabricating overcladding tubes by sol-gel techniques. This well-known procedure is described, for example, in J. Zarzycki, "The Gel-Glass Process", pp. 203-31 in Glass: Current Issues, A. F. Wright and J. Dupois, eds., Martinus Nijoff, Boston, Mass. (1985). Sol-gel techniques are regarded as potentially less costly than other known preform fabrication procedures. While sol-gel fabrication of overcladding tubes, and other optical glass components, has met with considerable success, improvements are continually sought.

A persistent problem in making very large sol-gel bodies, e.g. greater than 5 Kg, for state of the art optical fiber drawing is cracking of the gelled body. Cracking may occur during drying or handling of the gelled body prior to consolidation. See for example, T. Mori, et al, "Silica Glass Tubes By New Sol-Gel Method", J. Non-Crystalline Solids, 100, pp. 523–525 (1988), who describe the cracking problem, and recommend modification of the starting mixture and of the gel forming process, both of which are involved and expensive. The cracking problem is explained in a paper by Katagiri and Maekawa, J. Non-Crystalline Solids, 134, pp. 183–90, (1991) which states, "One of the most important problems in the sol-gel preparation method for monolithic gels is avoidance of crack formation which occurs during drying". A 1992 paper published in the Journal of Material Science, vol. 27, pp. 520–526 (1992) is even more explicit: "Although the sol-gel method is very attractive, many problems still exist, as pointed out in Zarzycki. Of these problems, the most serious one is thought to be the occurrence of cracks during drying of monolithic gel". The reference then reviews remedies, e.g. hypercritical drying procedures and use of chemical additives such as N,N dimethylformamide, collectively referred to as Drying Control Chemical Additives. Both methods are regarded as expensive and, therefore, undesirable in routine glass production. An extensive description of a suitable sol-gel process, and of additives useful for improving the strength of sol-gel bodies, is contained in U.S. Pat. No. 5,240,488, which is incorporated herein in its entirety.

The cracking problem becomes more severe as the size of preforms in commercial fiber production increases. State of the art optical fiber manufacture typically involves drawing hundreds of kilometers of fiber from a single preform. These preforms typically exceed 5 Kg in size. Although improvements in techniques for making large sol-gel bodies have been made, strength continues to be an issue and any process modification that results in improvement in the strength of intermediate products during the sol-gel process will constitute a valuable contribution to the technology.

SUMMARY OF THE INVENTION

We have developed a modified colloidal sol-gel process for making large sol-gel bodies of silica, and silica-containing, glasses. The modification takes advantage of a surprising discovery that the starting material in the sol-gel process, silica particulates, may be much larger than previously thought. We formulated sol-gel bodies using colloidal suspensions of silica particles in the size range defined by 5–25 $m^2$ per gram. These particles are substantially larger than those typically recommended, i.e. 50 $m^2$ per gram. Contrary to expectation, colloids formed with these large particles did not result in premature settling, as would have been expected.

Also contrary to expectation, wet sol bodies with very high solids loading, i.e. 65–78%, may be obtained using large particulate starting materials and proper processing. These large loading quantities are found to improve wet strength without impairing sol stability and rheology. Due to the large loading, shaped sol bodies in the "green" state more closely match the dimensions of the final desired form and thus allow for more complex shapes and greater dimensional control.

It was also found that particle morphology contributes significantly to the improved results. Particles with essentially spherical shapes are necessary for the results obtained. Conventional silica particle mixtures contain both spherical and non-spherical particles, the latter in quantities of 30% or more. We have achieved the improved results reported here using particle mixtures with less than 15% and preferably less than 10% non-spherical.

Sol-gel bodies formulated using these starting colloids result in strength improvements of 100%, and in some cases, 300%. The enhanced strength as well as higher loading allows faster drying of the sol, thus reducing overall processing time. The reduced surface area per gram also allows additives to be included in smaller amounts. This lowers the cost of materials and also decreases the process time required for burn-off of additives. These processing efficiencies translate into lower production cost, especially for very large bodies.

DETAILED DESCRIPTION

A variety of optical fiber manufacturing techniques have been proposed. The well known "rod-in-tube" process is widely used commercially. It involves inserting a core rod into an overcladding tube typically made by a soot process to produce a preform. The preform is drawn into a fiber by well known fiber draw techniques. As an alternative, according to one embodiment of this invention, at least a portion of the preform is produced by a sol-gel process. The sol-gel process may be used to form either the overcladding tube or the core rod (or both). Most typically, the full advantages of the sol-gel approach are realized in forming large bodies of silica, or silica containing glass, used for overcladding material. The silica bodies produced by the technique of the invention may be doped or undoped. When used for core rods, the silica may be pure, or may be up-doped with germania or equivalent dopant. The cladding material may be undoped, or may have portions that are down doped with fluorine.

When used as overcladding, a known approach is to insert the core rod into an unsintered cladding tube and consolidate the cladding tube onto the core rod. This approach, described in U.S. Pat. No. 4,775,401, issued Oct. 4, 1988, may be preferred since it avoids a separate sintering step thereby decreasing the total number of steps required. It also produces excellent preform symmetry thus reducing the risk of excess Polarization Mode Dispersion (PMD) in the finished fiber. An important requirement of the preform overcladding tube is dimensional stability and reproducibility. It should have an inner surface which is smooth and of uniform diameter so as to mate with the core. Both inside and outside diameter precision is desirable for controlling core-to-clad ratio in the drawn optical fiber.

It has been found that the use of large particulates of silica powder as the starting silica material contributes to attaining these and other goals. The size of these particulates is most conveniently defined in terms of the surface area of the silica powder, i.e. $m^2$ per gram. The initial step in the sol-gel process is to intimately mix the silica particles in water, to create a solid-liquid colloidal dispersion. The recommended range of silica powder particulates is 5–25 $m^2$/gram, and preferably 5 to less than 20 $m^2$/gm. This is an average particle size. Those skilled in the art understand that typical commercial silica powders contain particles with a broad range of sizes. The conventional range may extend from a few nanometers to over 100 nanometers. Commercial powders are sized by surface area per unit weight, typically $m^2$ per gram. This standard measure accounts for a range of particle sizes but, on average, a smaller number in terms of $m^2$/gram translates directly into a larger average particle size. In silica powders rated at 5–20 $m^2$/gram, the particle size distribution will generally be in the range 0.15 to 1.0 microns.

Figure 1:
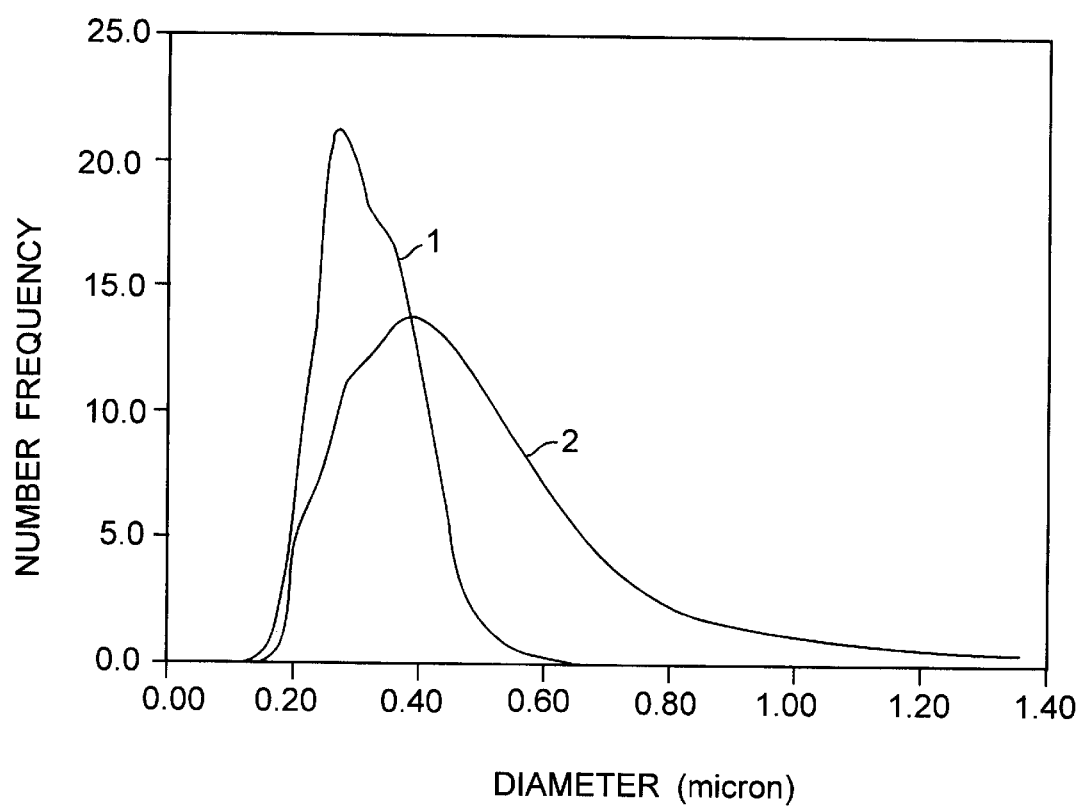
FIG. 1 is a distribution plot showing the particle sizes for two suitable silica powder compositions according to the invention.

Distribution plots for two such powder mixtures are shown in FIG. 1. Curve 1 is for an experimental silica powder and is included as an example of a mixture with suitable particle size and distribution. Curve 2 shows size and distribution data for a silica powder product designated SE-1 and available from Tokuyama Corp. The morphology of the particles in these mixtures compared with conventional silica powders are defined by examination of electron micrographs to be presented subsequently.

The silica powder just described is dispersed in water to form the colloidal sol. A colloid, as is well known in colloidal chemistry, is a dispersion of particulates that resembles a solution, but retains two distinct phases, in this case, liquid and solid. The solid particles remain suspended in the liquid by surface forces on the particles. Classic definitions of colloid particle size vary. The capability of a small particle to remain suspended in a liquid depends on many factors, the main ones being the nature of the dispersand, particularly the mass, and the nature of the dispersant, particularly the viscosity. The simplest way to prescribe sol systems useful for the invention are those in which the particulates remain suspended for a period sufficient to form a gel body. Particles in powders that are characterized by 5–18 $m^2$/gram are relatively large and would be expected to settle relatively rapidly in water. However, we have found, unexpectedly, that the settling of relatively large silica particles in water is hindered by the presence of smaller particles that are in stable suspension. This suggests that it is desirable to have a spread of particle sizes in the powder. The spread may be very large but a minimum distribution of at least 20 microns from the smallest to the largest particle should provide a sufficiently stable colloid matrix to provide hindered settling of the larger particles.

In forming the water/silica powder suspension, thorough mixing is required. A standard high shear mixer is typically used, and the viscosity and time of mixing are important in achieving complete homogenization. (For details, see U.S. patent application Ser. No. 09/365,191 filed Aug. 2, 1999, which is incorporated herein by reference.) It is found that the use of larger silica particles, according to the invention, substantially enhances dispersion and reduces mixing time.

The amount of silica particles by weight in the process of the invention is between 65% and 78% by weight. This is exceptionally high loading, and leads to important advantages which will be identified below.

After thorough mixing of the silica particles in water, the pH of the mixture is adjusted, using a water soluble base, to a pH level in the range 10–13, typically approximately 12. In the preferred procedure according to the invention the pH of the mixture is adjusted using tetramethylammonium hydroxide (TMAH). Other water soluble bases, e.g. tetraethylammonium hydroxide, may also be used. Due to the relatively large particles, and the lower surface area of the particles in suspension, an unexpectedly small amount of base is required to effect the pH adjustment. It is found that less than 2% by weight of TMAH is sufficient. The 2% by weight is a percentage based on the dry weight of silica. In some cases 1.5% or even 1.0% soluble base is adequate. The sol is then typically aged for several hours.

Additives, such as plasticizers and/or binders, can be added to the stabilized sol to impart a variety of desired characteristics. Typically these are organic materials that are burned off later in the process, i.e. heat treatment just prior to consolidation. A wide variety of additives have been proposed. Many of these are discussed in U.S. Pat. No. 5,240,488, referenced above. Included among the additives are polyamines, polyhydric alcohols, and glycerin. These additives aid in the preparation of the sol/gel but are frequently not desired in the silica product. This is especially the case with optical fiber preforms. Consequently it is necessary to burn-off the organic additive while the body is porous, before consolidation. These additives typically impart their functionality in the gelation part of the process, providing enhancement by coating the surface of the silica particles. The amount of additive needed is therefore related to the surface area of the silica particles. As indicated in the patent referenced above, the recommended amount of additive is that sufficient to provide at least a single molecular layer (monomolecular layer) on a substantial portion of the surface area of the particles. Empirical data shows that complete coating of every particle is not necessary or even desired. Therefore the usual optimum amount is in the range of 5–50% of the total particle area. It will be appreciated by those skilled in the art that following this prescription in the context of the present invention will result in a lower amount of additive required. The reduction in additive is approximately equal to the reduced surface area ratio. The typical silica powder used in prior art sol-gel processes has a recommended surface area of 50 $m^2$/gram or more. The silica particle size according to this invention is in the range 5–18 $m^2$/gram. Using the area ratios, the amount of additive required in the process of the invention is 10–36% of that used in the prior art process. The reduction in additive used obviously results in a cost saving. However, more importantly, less organic additive needs to be removed from the gelled body later in the process. Reducing the firing time and/or severity by 3 to 10 times, as would result from using only 10–36% of the recommended amount of additive, leads to important process advantages.

The above prepared sol was gelled by lowering the pH over several minutes. In the preferred process, this is achieved by adding 0.5 –2%, typically 1%, of methyl formate (MF). Other aqueous esters or ester forming substances may also be used. The pH target is approximately 9. After adding the gelling agent, and before substantial gelling occurs, the sol is cast in the size and shape desired. An important advantage of the sol-gel process is that it can be used to form shaped glass bodies by simple molding of the gel. Since the gel is initially in a liquid state, it may be poured into a mold of the desired shape and gelled in situ.

Figure 2:
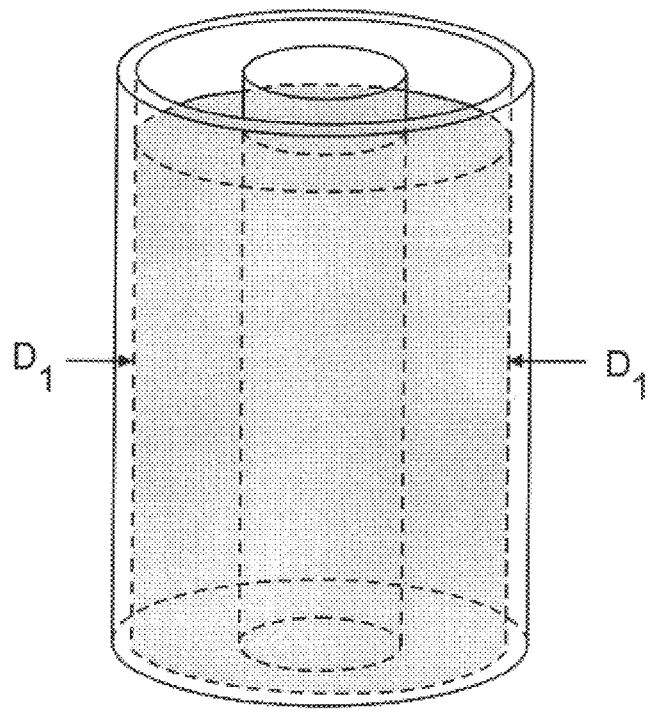
FIG. 2 is a schematic representation of a molding step used to produce a sol-gel body according to the invention.

FIG. 2 shows a mold adapted to forming a cylindrically shaped glass body. It will be understood that the dimensions in the drawing are not necessarily to scale and certain features may be exaggerated for clarity.

The objective of the process to be described is to produce a relatively thick-walled tubular structure suitable as an overcladding tube for an optical fiber preform. This embodiment is given by way of example only of a large variety of sizes and shapes in which silica bodies can be made according to the teachings of the invention.

In FIG. 2 the mold 11 is a cylindrically shaped vessel with a concentric center tube 12. The mold may comprise any suitable material such as stainless steel. After adding the gelling agent, and before substantial gelling occurs, the sol 14 (shown shaded) is cast into the space between the two concentric tubes. The inside diameter of the outer tube fixes the approximate outside diameter of the porous cladding tube and the outside diameter of the inside steel rod or tube determines the inside diameter of the porous cladding tube. The final dimensions of the consolidated cladding tube will be determined by the shrinkage of the gel upon drying and further shrinkage of the porous cladding tube during consolidation. These dimensional changes are well known, very reproducable, and are taken into account when designing the sol gel mold.

After the gel is formed, typically after 12–24 hours standing, the mold is removed. It is convenient to have center post 12 separately removable from the mold cylinder 11. The cylinder may comprise two or more parts to facilitate unmolding. The "green" body is then dried for at least several days (typically 72–500 hours). The drying operation should take into account the shape of the body and avoid physical distortion of the shape due to gravity, especially in the early stages of drying. Cracking of the gel is a well known problem. Handling the green gel body, and drying the gel, should be carried out carefully to avoid cracking.

The inherent "wet" strength of the gel is an important process parameter, particularly when making bodies with large and/or complex shapes. It was found, unexpectedly, that the wet strength of gel bodies made with large silica particles, according to one feature of the invention, is enhanced, and in most cases, enhanced by more than 100%.

Figure 3:
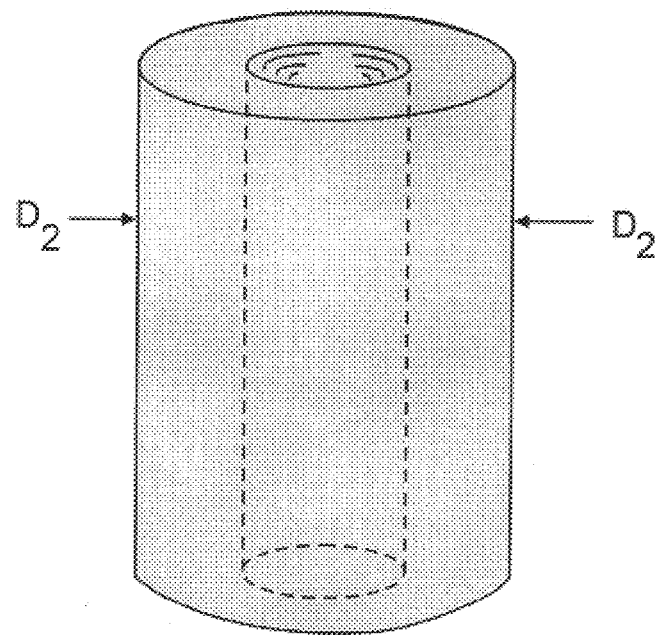
FIG. 3 is a view of the molded sol body after drying.

The use of relatively large particles is found to result in reduced propensity of the particles to agglomerate in the suspension. As a consequence, dramatically higher loading, up to 78% by weight, is possible. In conventional processing, attempts to load the sol with that much solid phase results in an unmanageable increase in viscosity. However, larger particles tend to aggregate less, and therefore flow more easily. The important consequence of load factors this high in the gel body is that there is a lower volume of dispersant to be removed in the drying step. Reducing the dispersant volume leads to two important results. One, the time required for the drying step, usually the most time consuming phase of the process, may be dramatically reduced. Two, because of very high loading of solids in the gel, the dimensions of the gel body are nearer to the dimensions of the final body, i.e. there is less shrinkage during drying. This adds not only to dimensional control, that is, the final average dimensions more closely match those of the gel, but the relative dimensions of the body, i.e. those that determine the shape of the body, are preserved. This is illustrated in FIGS. 2 and 3 where the inside diameter $D_1$ of the mold, to take just one dimension, determines the outside diameter of the gel body. After drying, the diameter of the silica body 21 in FIG. 3 corresponds to $D_2$. The ratio $D_2/D_1$ is the shrinkage factor. With sol loading greater than 65%, as compared to 50% in the typical prior art process, the shrinkage factor can be expected to be reduced by approximately 25% or more.

The dried porous cladding tube is heated slowly to a temperature above 600° C. and preferably approximately 1100° C. to burn out organic additives and to strengthen the material for further handling. As indicated above, the burn-out step may be considerably shortened, or the temperature required may be reduced, due to the reduced amount of additives added. At this point the tube has sufficient integrity to be handled but is still porous. The tube is then consolidated by heating the tube to a temperature in the range 1300–1800° C.

In order to differentiate, and in so doing define, the morphological difference between the powders recommended for use with this invention, and those previously used and produced by fumed particle techniques (fumed silica), we prepared a series of electron micrographs as follows. The fumed silica with nominal surface area about 50 m$^2$/gm from suppliers such as Degussa Corp. was mixed with water so as to form a 2–3 wt % dispersion. A drop of this dispersion was placed on a carbon coated copper grid. After about a minute, the liquid was blotted off and the grid was dried and placed in a transmission electron microscope. The operating voltage was 200 KV, which allowed magnification factor of about 200,000. Several sections of the grid containing clusters of particles were imaged quickly so as to avoid any alteration by prolonged exposure to the electron beam. The micrographs were then analyzed carefully for particle size distribution and morphology (or shape). The sample size contained at least 500 random particles. As is well known, it was seen that particle size distribution was broad with sizes ranging from 5 to 150 nm. It was also determined that these powders typically contained less than about 70% of primary, spherical particles. The rest were partially sintered or fused aggregates, with a dumb-bell or necklaced morphology. This was seen to be a consistent feature of several powder lots made over a period of 10 years and hence can be considered to be a characteristic of the 50 m$^2$/gm fumed silica powder.

When the SE-1 or similar powders from Tokuyama Corp were analyzed as described above, it was seen that they had essentially 100% spherical particles. This was in marked contrast with the morphology of the 50 m$^2$/gm particles. The particles ranged in size from about 50 nm to 1 micron.

The following examples of optical fiber preform manufacture are given to illustrate the invention.

EXAMPLE 1

A sol containing about 55 wt % commercial fumed silica particles with a nominal specific surface area of 50 m$^2$/gm and approximately 30% nonspherical morphology was made using 1.5 wt % tetramethylammonium hydroxide (TMAH) as a stabilizer. This was mixed with 1.75 wt % of methyl lactate, as the gelling agent. The sol was poured in to mold about 15 cm long and 1 cm in diameter. Gelling took place at room temperature in about 15 minutes. The gel was aged for about 3–24 hours and then extracted from the mold. The wet gel rod was then subjected to a MOR 3-point bend test, as stipulated by the ASTM standard C674-81. The typical MOR was seen to be about 0.07 MPa.

EXAMPLE 2

A sol containing about 65 wt % commercial fumed silica particles with a nominal specific surface area of ~15 m$^2$/gm and less than 10% non-spherical morphology was made using 1.5 wt % tetramethylammonium hydroxide (TMAH) as a stabilizer. This was mixed with 1.75 wt % of methyl lactate as the gelling agent. The sol was poured in to mold about 15 cm long and 1 cm in diameter. The resultant cylindrical gel was aged for about 3–24 hours and then extracted from the mold. The wet gel rod was then subjected to a MOR 3-point bend test, as described above. The typical MOR was seen to be about 0.15 MPa. Furthermore, it was found that the maximum wet strength of the gels made of large particles is reached after only a few hours of aging. In comparison, gels made of 50 m$^2$/gm particles require 12–24 hours to reach maximum wet strength. Since strengthening in this case is accompanied with significant syneresis which aids de-molding, aging times of gels made of large particles can be reduced by about 10–20 hours.

EXAMPLE 3

A sol containing about 75 wt % commercial fumed silica particles with a nominal specific surface area of ~15 m$^2$/gm and less than 10% morphology was made using 1.0 wt % tetramethylammonium hydroxide (TMAH) as a stabilizer. This was mixed with 1.2 wt % of methyl lactate as the gelling agent. The sol was poured in to mold about 15 cm long and 1 cm in diameter. The resultant cylindrical gel was aged for about 3–24 hours and then extracted from the mold. The wet gel rod was then subjected to a MOR 3-point bend test, as described above. The typical MOR was seen to be about 0.2 MPa.

EXAMPLE 4

A sol containing about 72 wt % commercial fumed silica particles with a nominal specific surface area of 15 m$^2$/gm and less than 10% non-spherical morphology was made using 1.0 wt % tetramethylammonium hydroxide (TMAH) as a stabilizer. This was mixed with 1.2 wt % of methyl lactate as the gelling agent. The sol was poured in to a mold about 50 cm long and 16 cm ID. A mandrel, 3 cm OD, was used to define the inner bore. Upon aging the gel for about 5 hours, it was extracted from the mold and placed in the drier. For drying, the initial conditions were 75% RH and 21° C.; gradually the humidity was lowered and temperature, increased to finish the drying in about 6 days.

EXAMPLE 5

The samples made as described in Example 2 and 3 were dried at 30% RH and room temperature for about 1 day. The dried rods were placed in a furnace and heated to rid of the organics. Nitrogen was used up to about 350° C., at which point it was substituted with air. Eventually, the dried gels were purified in 10 vol % Cl$_2$ at 1000° C. and cooled. They were then sintered to complete transparency at 1500° C. in flowing He in about 0.5h.

Figure 4:
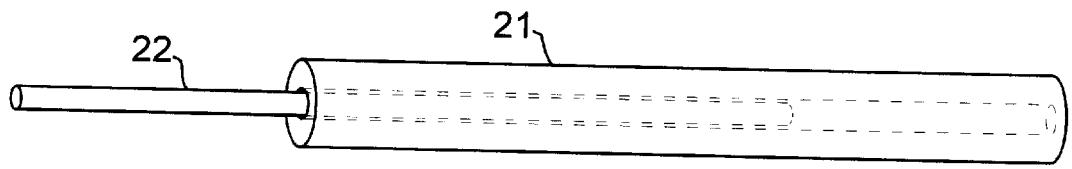
FIGS. 4 and 5 are schematic views of the rod-in-tube process, taking advantage of the cladding tube fabrication technique of the invention.
Figure 5:
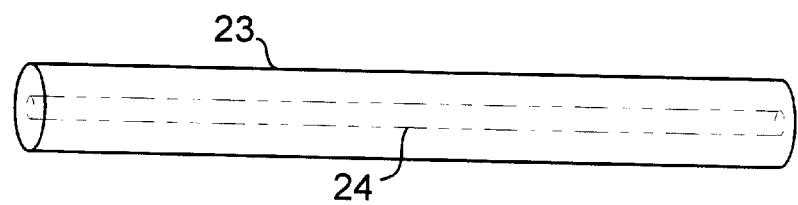

The foregoing examples illustrate the production of optical fiber cladding tubes useful for preparing a rod-in-tube preform. The procedure is illustrated in FIGS. 4 and 5. As indicated earlier the drawing is not to scale. The cladding tube shown in FIGS. 2 and 3 is shown with an abbreviated length. A cladding tube more representative of dimensions actually used is shown in FIG. 4 at 21. A typical length to diameter ratio is 10–15. The core rod 22 is shown being inserted into the cladding tube. The rod and/or the tube at this point may be either already consolidated or still porous. Typically the cladding tube is porous and is consolidated around the core rod. There exist several common options for the composition of the core rod. It may be pure silica, adapted to be inserted into a down doped cladding tube. It may have a pure silica center region with a down doped outer core region. It may have an up-doped, e.g. germania doped, center core region surrounded by a pure silica region. It may have an up-doped center core region surrounded by a down doped outer core region. All of these options are well known in the art and require no further exposition here. After assembly of the rod 21 and tube 22, the combination is sintered to produce the final preform 23 shown in FIG. 5, with the core 24 indistinguishable from the cladding except for a small refractive index difference.

Typical dimensions of the rod and cladding tube are also well known. The diameter of a consolidated cladding tube for a standard multi-mode fiber is approximately twice the diameter of the core rod. In the case of a preform for a single mode fiber the diameter of the rod is approximately 5% of the final diameter of the cladding tube.

Figure 6:
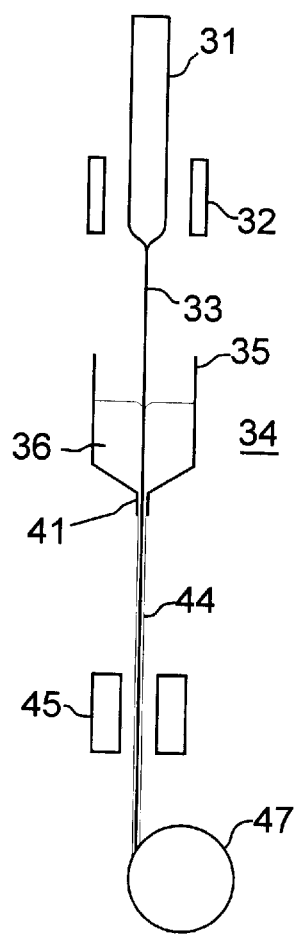
FIG. 6 is a schematic representation of a fiber drawing apparatus useful for drawing preforms made by the invention into continuous lengths of optical fiber.

The consolidated perform is then used for drawing optical fiber in the conventional way. FIG. 6 shows an optical fiber drawing apparatus with preform 31, and susceptor 32 representing the furnace (not shown) used to soften the glass preform and initiate fiber draw. The drawn fiber is shown at 33. The nascent fiber surface is then passed through a coating cup, indicated generally at 34, which has chamber 35 containing a coating prepolymer 36. The liquid coated fiber from the coating chamber exits through die 41. The combination of die 41 and the fluid dynamics of the prepolymer, controls the coating thickness. The prepolymer coated fiber 44 is then exposed to UV lamps 45 to cure the prepolymer and complete the coating process. Other curing radiation may be used where appropriate. The fiber, with the coating cured, is then taken up by take-up reel 47. The take-up reel controls the draw speed of the fiber. Draw speeds in the range typically of 1–20 m/sec. can be used. It is important that the fiber be centered within the coating cup, and particularly within the exit die 41, to maintain concentricity of the fiber and coating. A commercial apparatus typically has pulleys that control the alignment of the fiber. Hydrodynamic pressure in the die itself aids in centering the fiber. A stepper motor, controlled by a micro-step indexer (not shown), controls the take-up reel.

Coating materials for optical fibers are typically urethanes, acrylates, or urethane-acrylates, with a UV photoinitiator added. The apparatus is FIG. 6 is shown with a single coating cup, but dual coating apparatus with dual coating cups are commonly used. In dual coated fibers, typical primary or inner coating materials are soft, low modulus materials such as silicone, hot melt wax, or any of a number of polymer materials having a relatively low modulus. The usual materials for the second or outer coating are high modulus polymers, typically urethanes or acrylics. In commercial practice both materials may be low and high modulus acrylates. The coating thickness typically ranges from 150–300 $\mu$m in diameter, with approximately 240 $\mu$m standard.

The process described herein is especially useful for producing large sol-gel optical fiber preforms. Large sol-gel bodies in current commercial parlance means bodies with a weight greater than 6 Kg, typically with a diameter greater than 50 mm, and frequently greater than 75 mm. The invention is also well adapted for producing smaller and lighter silica bodies but which heretofore have proved difficult to make because of the shape of the body. It will be intuitively understood that an elongated silica body, or an odd shaped silica body, having at least one dimension of, for example, six inches could present at least the same challenge as a 6 Kg, or even 20 Kg, body with a compact shape.

Reference herein to silica bodies means, in the case of optical fiber preforms, highly pure silica bodies. The silica base material for optical fiber preforms necessarily excludes impurities such as water or iron. They may however, include small amounts of dopants, such as fluorine, for modifying refractive index. Other kinds of silica bodies may include significant amounts of glass forming oxides or other additives. The term silica body is intended to refer to a body in which the predominant ingredient, more than 50% by weight, is silica.

In concluding the detailed description, it should be noted that it will be obvious to those skilled in the art that many variations and modifications may be made to the preferred embodiment without substantial departure from the principles of the present invention. All such variations, modifications and equivalents are intended to be included herein as being within the scope of the present invention, as set forth in the claims.

What is claimed is:

1. Process for the manufacture of a silica glass body comprising:
    (a) preparing a sol by mixing silica particles and water, the silica particles having a surface area defined by the range 5–25 m² per gram, and containing at least 85% spherical particles, with the ratio by weight of silica particles to water being greater than 65%,
    (b) adding less than 2% by weight based on the weight of silica particles of a water soluble base to adjust the pH of the sol to a value in the range 10–13,
    (c) adding a gelling agent to the sol,
    (d) casting the sol into a mold,
    (e) gelling the sol in the mold to form a gelled body in the shape of the mold,
    (f) removing the gelled body from the mold, and
    (g) firing the gelled body to consolidate the gelled body into a vitreous silica body.

2. The process of claim 1 wherein the water soluble base is selected from the group consisting of tetramethylammonium hydroxide and tetraethylammonium hydroxide.

3. The process of claim 1 wherein the sol contains at least one organic additive in sufficient quantity to monomolecularly coat from 5% to 50% of the total free surface of the silica particles.

4. The process of claim 1 where the silica particles have a surface area of less than 20 m² per gram.

5. Process for the manufacture of optical fiber preforms comprising:
    (a) preparing a porous silica body of silica particles, said porous silica body having a weight greater than 5 kg, by the steps of:
        (i) preparing a sol by mixing silica particles and water, the silica particles having a surface area defined by the range 5–25 m² per gram, with at least 85% of the silica particles being spherical, and the ratio by weight of silica particles to water being greater than 65%,
        (ii) adding less than 2% by weight based on the weight of silica particles of a water soluble base to adjust the pH of the sol to a value in the range 10–13,
        (iii) adding a gelling agent to the sol,
        (iv) casting the sol into a mold,
        (v) gelling the sol in the mold to form a gelled body in the shape of the mold, and
        (vi) removing the gelled body from the mold,
    (b) heating the porous silica body at a temperature greater than 1300° C. to consolidate the porous silica body into a preform.

6. Process for the manufacture of optical fiber comprising:
    (a) preparing a porous silica body of silica particles, said porous silica body having a weight greater than 5 kg, by the steps of:
        (i) preparing a sol by mixing silica particles and water, the silica particles having a surface area defined by the range 5–25 m² per gram, with at least 85% of the silica particles being spherical, and the ratio by weight of silica particles to water being greater than 65%,
        (ii) adding less than 2% by weight based on the weight of silica particles of a water soluble base to adjust the pH of the sol to a value in the range 10–13, (iii) adding a gelling agent to the sol,
(iv) casting the sol into a mold,
(v) gelling the sol in the mold to form a gelled body in the shape of the mold, and
(vi) removing the gelled body from the mold,
(b) heating the porous silica body at a temperature greater than 1300° C. to consolidate the porous silica body into a preform,
(c) mounting the preform in a fiber draw apparatus, and
(d) drawing optical fiber from the preform.

7. The process of claim 6 wherein the water soluble base is selected from the group consisting of tetramethylammonium hydroxide and tetraethylammonium hydroxide.

8. The process of claim 6 wherein the sol contains at least one organic additive in sufficient quantity to monomolecularly coat from 5% to 50% of the total free surface of the silica particles.

9. The process of claim 6 further including the step of centrifuging the silica particles to remove impurities.

10. The process of claim 6 including the additional steps of adding an organic additive to the sol in a reduced amount.

11. The process of claim 10 including the step of heating the gelled body to a temperature and for a time sufficient to burn off the organic additive, said temperature and/or time being reduced due to the reduced amount of additive present.

12. The process of claim 6 where the silica particles have a surface area of less than 20 $m^2$ per gram.

* * * * *